United States Patent
Lindskog et al.

(10) Patent No.: US 12,028,136 B2
(45) Date of Patent: Jul. 2, 2024

(54) SR HANDLING FOR ANALOG BEAMFORMING

(71) Applicant: Telefonaktiebolaget LM Ericsson (publ), Stockholm (SE)

(72) Inventors: Jan Lindskog, Pixbo (SE); Per Löfving, Mölndal (SE); Pär Ankel, Nödinge (SE); Bin Jiang, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 25 days.

(21) Appl. No.: 17/792,023

(22) PCT Filed: Jan. 20, 2021

(86) PCT No.: PCT/EP2021/051227
§ 371 (c)(1),
(2) Date: Jul. 11, 2022

(87) PCT Pub. No.: WO2021/148485
PCT Pub. Date: Jul. 29, 2021

(65) Prior Publication Data
US 2023/0088907 A1    Mar. 23, 2023

Related U.S. Application Data

(60) Provisional application No. 62/963,925, filed on Jan. 21, 2020.

(51) Int. Cl.
*H04B 7/02* (2018.01)
*H04B 7/06* (2006.01)
(Continued)

(52) U.S. Cl.
CPC ......... *H04B 7/0617* (2013.01); *H04L 1/1829* (2013.01); *H04W 72/21* (2023.01)

(58) Field of Classification Search
CPC ..... H04B 7/0617; H04B 7/088; H04L 1/1829; H04W 72/21
(Continued)

(56) References Cited

U.S. PATENT DOCUMENTS 10,412,745 B2 *  9/2019  Fodor .................. H04L 27/261
10,505,616 B1 * 12/2019  Chen ................... H04B 17/336
(Continued)

FOREIGN PATENT DOCUMENTS

WO        2019032853 A1    2/2019

OTHER PUBLICATIONS

International Search Report dated Mar. 23, 2021 for International Application No. PCT/EP2021/051227 filed Jan. 20, 2021, consisting of 11 pages.
(Continued)

*Primary Examiner* — Helene E Tayong
(74) *Attorney, Agent, or Firm* — Weisberg I.P. Law, P.A.

(57) ABSTRACT

Method for a base station communicating with a plurality of User Entities, UE, according to a Time Division Duplex, TDD, access scheme via antennas, the base station being adapted for receiving Scheduling Requests, SRs, from the UEs, a SR indicating a request for scheduling an uplink transmission from a UE. The base station is communicating over a plurality of antennas associated with respective wide beams and narrow beams, a plurality of wide beams covering respective areas, whereby for each wide beam at least one narrow beam form a joint area with a wide beam. The TDD scheme involving at least a Physical Uplink Scheduling Control Channel, PUSCH, and including periodically appearing SR occasions, the base station being adapted for receiving and decoding a transmission from a UE and establishing whether a SR from at least one UE is received in a periodic occasion.

17 Claims, 10 Drawing Sheets

(51) Int. Cl.
*H04L 1/1829* (2023.01)
*H04W 72/21* (2023.01)

(58) Field of Classification Search
USPC .......................................................... 375/267
See application file for complete search history.

(56) References Cited

U.S. PATENT DOCUMENTS

2018/0310257 A1   10/2018  Papasakellariou
2019/0349962 A1   11/2019  Kim et al.

OTHER PUBLICATIONS

Lin et al. "5G New Radio: Unveiling the Essentials of the Next Generation Wireless Access Technology"; Wireless and Radio Communications; IEEE Communications Standards Magazine; 30-37, Sep. 2019, consisting of 8 pages.

3GPP TS 38.212 V15.8.0; 3rd Generation Partnership Project; Technical Specification Group Radio Access Network; NR; Multiplexing and channel coding (Release 15); Dec. 2019, consisting of 101 pages.

3GPP TS 38.213 V15.8.0; 3rd Generation Partnership Project; Technical Specification Group Radio Access Network; NR; Physical layer procedures for control (Release 15); Dec. 2019, consisting of 109 pages.

3GPP TS 38.321 V15.8.0; 3rd Generation Partnership Project; Technical Specification Group Radio Access Network; NR; Medium Access Control (MAC) protocol specification (Release 15); Dec. 2019, consisting of 78 pages.

\* cited by examiner

SR HANDLING FOR ANALOG BEAMFORMING

CROSS-REFERENCE TO RELATED APPLICATIONS

This application is a Submission Under 35 U.S.C. § 371 for U.S. National Stage Patent Application of International Application No. PCT/EP2021/051227, filed Jan. 20, 2021 entitled "SR HANDLING FOR ANALOG BEAMFORMING," which claims priority to U.S. Provisional Application No. 62/963,925, filed Jan. 21, 2020, the entireties of both of which are incorporated herein by reference.

TECHNICAL FIELD

This invention is directed to methods and apparatus involving handing of scheduling requests in an analogue beam forming, ABF, based radio system. In particular, the invention is related to an ABF based Time Division Duplex, TDD, based 5G radio system.

BACKGROUND

A short overview of the physical layer in 5G New radio system has been given in "5G New Radio: Unveiling the Essentials of the Next Generation Wireless Access Technology", Xingqin Lin et al., Ericsson, June 2018.

In FIG. 1, the concept of TDD for a 3/1 pattern when used with ABF is shown. Slot n, slot n+1 . . . slot n+7 are shown.

The following channels are shown:
PDSCH (Physical Downlink Shared Channel)
PDCCH (Physical Downlink Control Channel) for DL (Downlink)
PDCCH for UL (Uplink)
PUSCH (Physical Uplink Shared Channel)
PUCCH (Physical Uplink Control Channel)

Slot n represents a Downlink, DL, slot where UE when decoding the PDCCH, 100, will receive DL data in PDSCH, 101, and where UE will report feedback of the decoded result, ACK or NACK, in PUCCH, 103. Field, 105, illustrates that PDCCH will contain a field representing where PDSCH data will be received and, 106, illustrates that PDCCH will contain a second field controlling when PUCCH, 103, will be transmitted. Slots n, n+1, n+2, n+4, n+5, n+6, represent DL slots, and slot n+3 and n+7 represents Uplink, UL, slots. PDCCH in slot n+3 comprise a PDCCH that represents an UL slot transmission. The PDCCH will contain a delay field, 107, which indicates when the PUSCH, 102, transmission will start in slot n+7.

For ABF, a phased array antenna will be used to define a number of semi-static beams. In this application we focus on ABF systems which use both semi static wide beams and semi static narrow beams. A plurality of narrow beams is arranged within each respective wide beam such that a wide beam serves a larger geographical area compared to a narrow beam. A narrow beam has a larger antenna gain compared to a wide beam. By semi static is meant that the beams wide beams and narrow beams are typically fixed after the antennas have been mounted and adjusted.

With respect to analogue beamforming, ABF, it is seen that in slot n the beam will point at a certain direction towards the UE where the PDCCH, 100, and PDSCH, 101, are aimed for, whilst in slot n+1 the beam may be in the same direction or other direction dependent on which UE data is aimed for in that particular slot, and the same goes for slot n+2. In slot n+3 the beam will first be set against the UE which may send data UL in PUSCH, 102, and then possibly switch direction to a part in slot n+3 to receive data from the UE that was scheduled for transmission at this slot (not seen in figure). Moreover, in PUCCH symbols denoted '0', '1' and '2' the beam will be set to receive PUCCH data from slot n, n+1 and n+2. If these slots represent data from different UE the beam will be changed between the PUCCH symbols.

Concerning Scheduling Requests, SR, Chapter 9.2.4 in 3GPP 28.213 V15.7.0 (2019 September) states: "A UE is configured by higher layer parameter SchedulingRequestResourceConfig a set of configurations for SR transmission in a PUCCH using either PUCCH format 0 or PUCCH format 1." Scheduling requests can be sent in PUCCH, 103, response—in that when a UE reports its ACK or NACK it can also include an SR=1 or 0 into the message (case a).

Chapter 9.2 in 3GPP 38.213 V15.7.0 (2019 September) states:
"UCI bits include HARQ-ACK information bits, if any, SR information bit, if any, and CSI bits, if any."
Instead of transmitting the SR bit (1) in the periodic SR the UE will append the SR bit in the ACK/NACK message."
More exactly the above reference specifies:
"If a UE would transmit a PUCCH with O_ACK HARQ-A K information bits in a resource using PUCCH format 2 or PUCCH format or PUCCH format 4 in a slot, as described in subclause 9.2.3, [log 2(K+1)] bits representing a negative or positive SR, in ascending order of the values of schedulingRequestResourceId are appended to the HARQACK information bits and the UE transmits the combined O_UCI=O_ACK+[$\log_2$(K+1)] UCI bits in a PUCCH using a resource with PUCCH format 2 or PUCCH format 3 or PUCCH format 4 that the UE determines as described in Subclauses 9.2.1 and 9.2.3. An all-zero value for the [$\log_2$(K+1)] bits represents a negative SR value across all K SRs."

A prerequisite, that can be denoted [preReq] for (case a) to occur is that (case b) occurs in the same time.

Hence, a UE will never transmit the SR bit in periodic SR if it has SR=0, but if case a and case b occurs the UE is forced to send the SR content whatever the value is 0 or 1.

The prerequisite [preReq] above is stated in 3GPP 38.213 referred to above.

Chapter 9.2.5.1 states:
"UE procedure for multiplexing HARQ-ACK or CSI and SR in a PUCCH.
In the following, a UE is configured to transmit K PUCCHs for respective K SRs in a slot, as determined by a set of schedulingRequestResourceId, with SR transmission occasions that would overlap with a transmission of a PUCCH with HARQ-ACK information from the UE in the slot or with a transmission of a PUCCH with CSI report(s) from the UE in the slot."

For example: Assume that the configured periodic SR occurs every 40'th slot. If now the gNB sends downlink data to UE so that the ACK or NACK will be sent in the same slot as the periodic SR occurs in—AND—that the periodic SR-PUCCH overlaps in time when the ACK-NACK PUCCHs start symbol occurs in time—THEN—the SR (either 0 or 1) will be merged into the ACK-NACK message.

As an alternative a Buffer Status Report, BSR, can be sent in a PUSCH (102) transmission. Since the BSR contains a better representation of the UE amount of pending data to send that outperforms the single bit representation that the scheduling request is capable of and when a BSR is sent the SR does not need to be sent (case c).

Chapter 6.2.1 in 3GPP 38.321 V15.7.0 (2019 September) shows the PDU format for BSR—being either Short BSR or Long BSR.

Also described in the referenced application, a scheduling request can also be sent in a random-access opportunity. More exactly, the UE will use that if no periodic SR opportunities are configured (case d).

PDCCH can be of different kinds. See 3GPP 38.212 V15.7.0 (2019 September), chapter 7.3.1. For PUSCH data transmission PDCCH format 0_1 is used. Within that format the following exists as stated in 3GPP UL-SCH indicator—1 bit. A value of "1" indicates UL-SCH shall be transmitted on the PUSCH and a value of "0" indicates UL-SCH shall not be transmitted on the PUSCH. A UE is not expected to receive a DCI format 0_1 with UL-SCH indicator of "0" and CSI request of all zero(s).

The above 'UL-SCH indicator' allows for transmission of CSI data which can be seen as a form of layer 1 control information. With the flag set to "0" the gNB will not expect any UL-SCH data to be received.

A HARQ protocol is used between gNB and UE. The details are specified in 3GPP TS 38.321 chapter 5.3.2. The purpose of the HARQ protocol is to recover from PDU decode failures in both directions by sending feedback (ACK/NACK) from receiver to transmitting side allowing for retransmission.

SUMMARY

According to a first aspect of the invention there is provided a method for a base station, gNB, communicating with a plurality of User Entities, UE, UE1, UE2 according to a Time Division Duplex, TDD, access scheme via antennas, the base station moreover being adapted for receiving Scheduling Requests, SRs, from the UEs, a SR indicating a request for scheduling an uplink transmission from a UE. The base station is communicating over a plurality of antennas associated with respective wide beams, WB1-WBn, and narrow beams, a plurality of wide beams covering respective areas, whereby for each wide beam at least one narrow beam form a joint area with a wide beam. The TDD scheme is involving at least a Physical Uplink Scheduling Control Channel, PUSCH, The TDD scheme moreover comprises periodically appearing SR occasions, the base station being adapted for receiving and decoding a transmission from a UE and establishing whether a SR from at least one UE is received in a periodic occasion.

According to a further aspect the periodically appearing SR occasions are distributed in such a manner that they reappear in at least a same slot number and/or symbol position of a frame in a repetitive sequence of frames, in other words that the periodically appearing occasions are vertically aligned in the TDD scheme.

The base station may be a 5G base station, gNodeB, and each periodically occurring SR occasion may be a periodic SR PUCCH.

According to an aspect of the invention, the base station is being adapted for using a wide beam for receiving and decoding at least one SR from a UE on the periodically occurring SR occasions.

DETAILED DESCRIPTION

Figure 1:
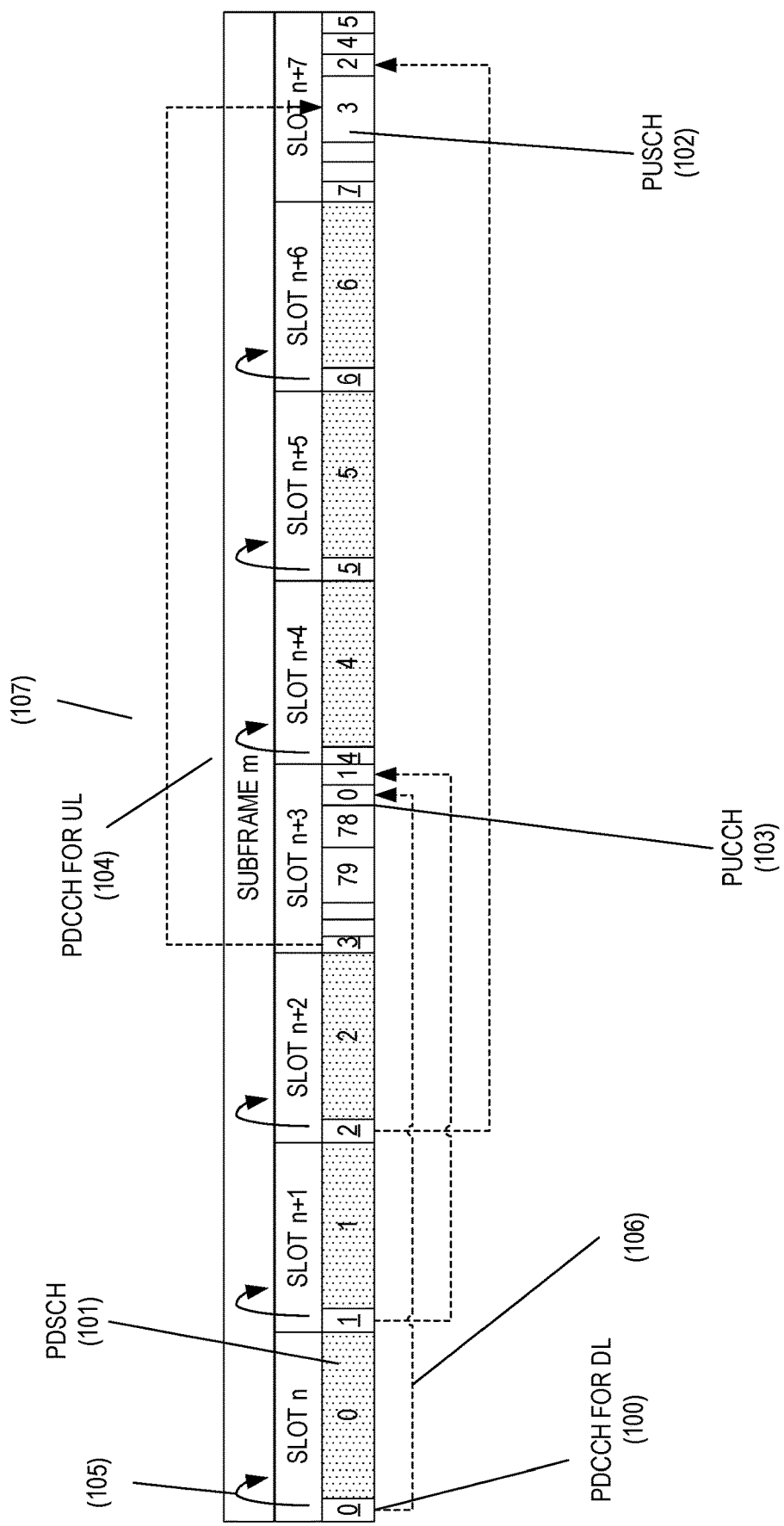
FIG. 1 shows a known 5G TDD transmission scheme.

According to an embodiment of the invention, a periodic SR, 300, is provided on the PUSCH channel 102 shown in FIG. 1.

Figure 2:
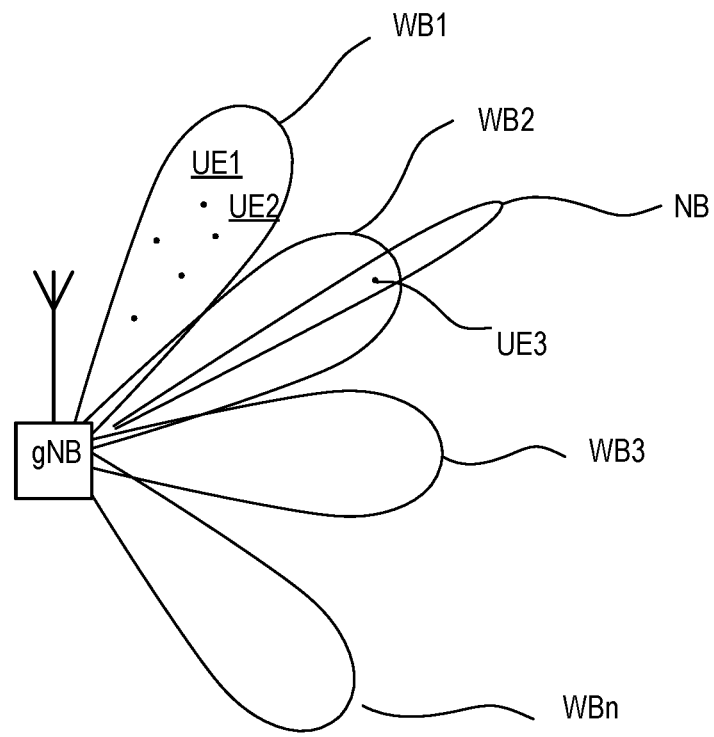
FIG. 2 shows exemplary apparatuses for realizing embodiments of the invention wherein a base station is configured with a plurality of wide beams, WB, and narrow beams, NB.

In FIG. 2, an arrangement for a base station according to embodiments of the invention is shown. In the embodiment shown, the base station may be a 5G base station, gNB. The base station communicates with UEs via a number of wide beam antennas, WB1-WBn, and narrow beam antennas, NB (only a single narrow beam indicated for clarity of illustration). The wide beam antennas may be arranged into contiguous substantially non-overlapping areas. Moreover, each wide beam may be further subdivided into a number of narrow beam areas. UEs may appear under any of these areas and processors, c.f. PCU_A, FIG. 3, are provided in the base station that are tracing the appearance of UE's under respective areas.

Figure 3:
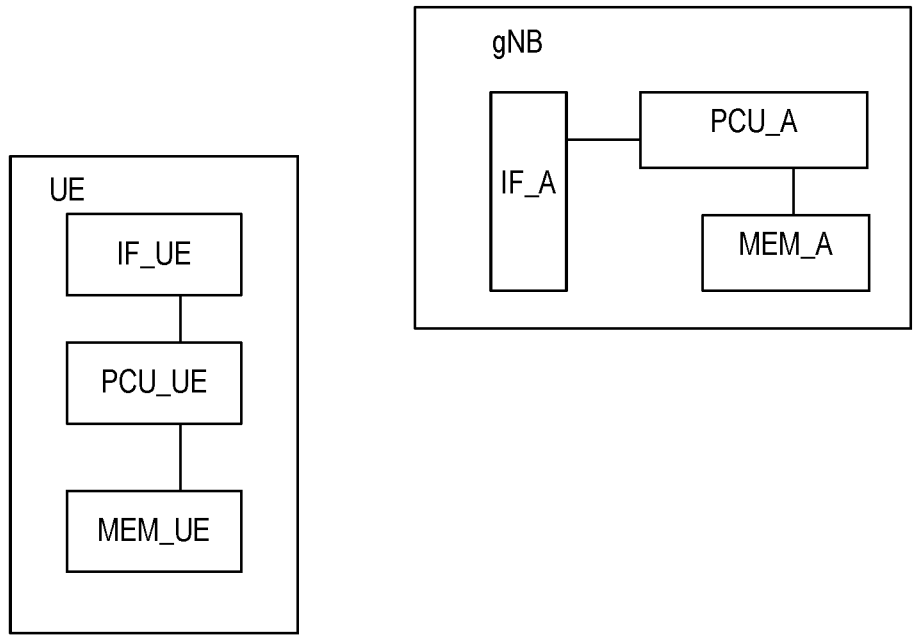
FIG. 3 shows further exemplary apparatuses for realizing embodiments of the invention comprising a base station, gNB, and a user entity, UE.

In FIG. 3 there is shown a user equipment, UE, apparatus according to the invention.

The UE comprises a processor PCU_UE an interface IF_UE and a memory, MEM_UE, in which memory instructions are stored for carrying out the method steps explained above. The UE communicates via the interface IF_UE. The IF_UE comprises both an external interface, communicating with a transmitter and receiver, and internal interfaces (not shown).

There is also shown a base station, such as a gNB, comprising a processor PCU_A, an interface IF_A; and a memory, MEM_A. Instructions are stored in the memory for being performed by the processor such that the method steps explained above are carried out and signalling is communicated on the interface.

The above apparatuses/entities are adapted to communicate over known external telecom interfaces or via application programming interfaces, API, as appropriate.

Figure 4:
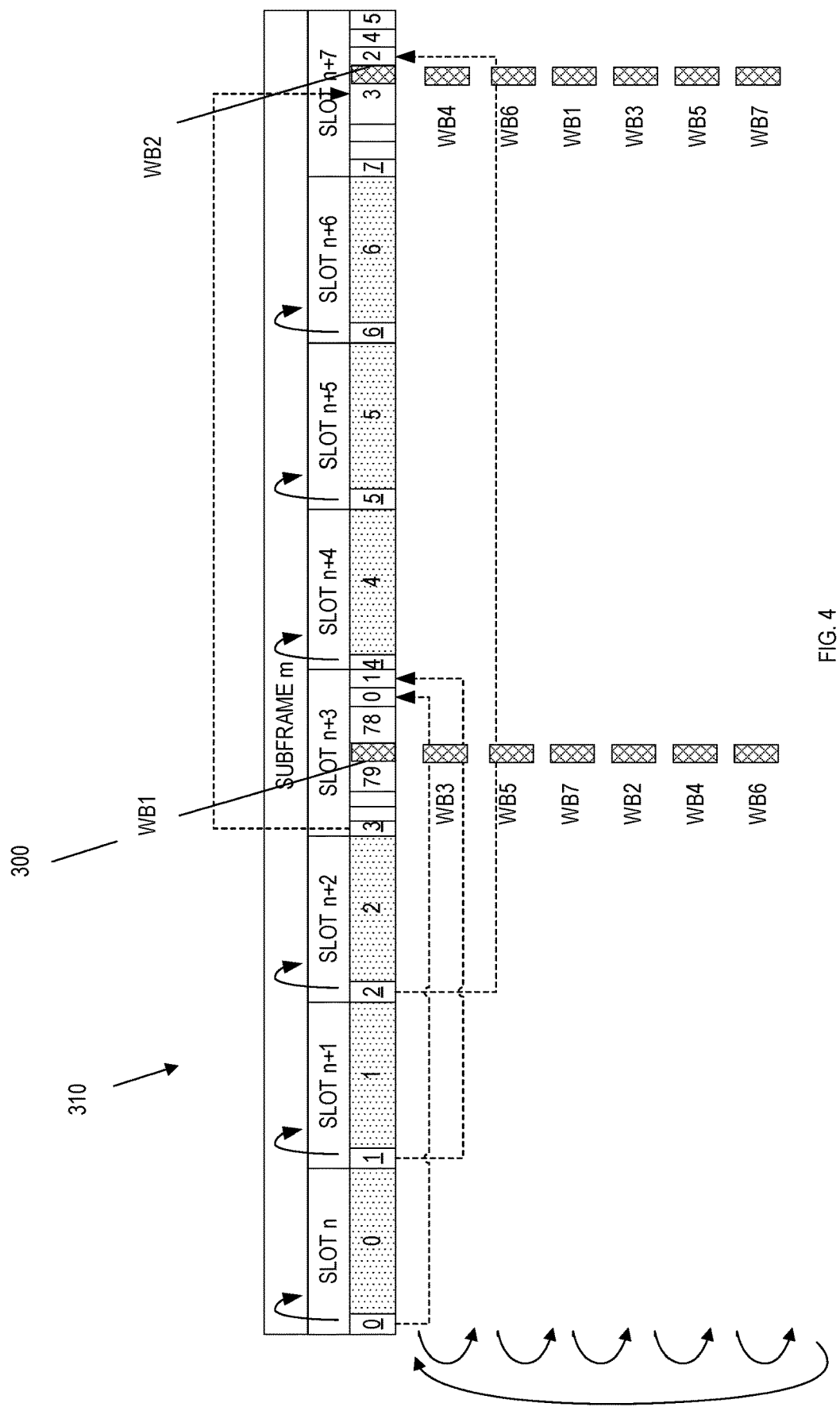
FIG. 4 shows a TDD scheme according to a first embodiment of the invention.

In FIG. 4, shows a TDD pattern, 310, according to the invention. The TDD pattern comprises seven rows identical to the first row, where we after the last row return to the first row and the pattern repeats.

A periodic SR, e.g. 1 symbol, 300, may now be configured—confer FIG. 1—in any of the 'light shaded' (79, 3, PUSCH (102)) parts.

Either the periodic SR is multiplexed in frequency with the existing content. If a SR is multiplexed, a problem will occur for the ABF in that the beam needs to serve a UE positioned in one location in the cell and a periodic SR for another UE positioned in another location in the cell. This can be seen as 'best effort' solution—gNB may be able to decode the SR.

If the SR replaces a symbol, a problem will occur to serve more than one UE if periodic SR for multiples of UE overlap in time due to the limitation with the narrow beam. Note that with ABF it might only be possible to direct one beam, one direction, per symbol.

In FIG. 4, the periodic SR, 300, occurs two times per row—with the periodicity=4 slot—and 14 opportunities. 10. It is noted that 3GPP requires a periodic SR to occur at a certain periodicity. By introducing more uplink slots, the periodicity can be increased.

When decoding the symbol representing the periodic SR, 300, a wide beam is used thus enabling reception from an expanded number of UE's under the corresponding geographical area of the wide beam.

Figure 5:
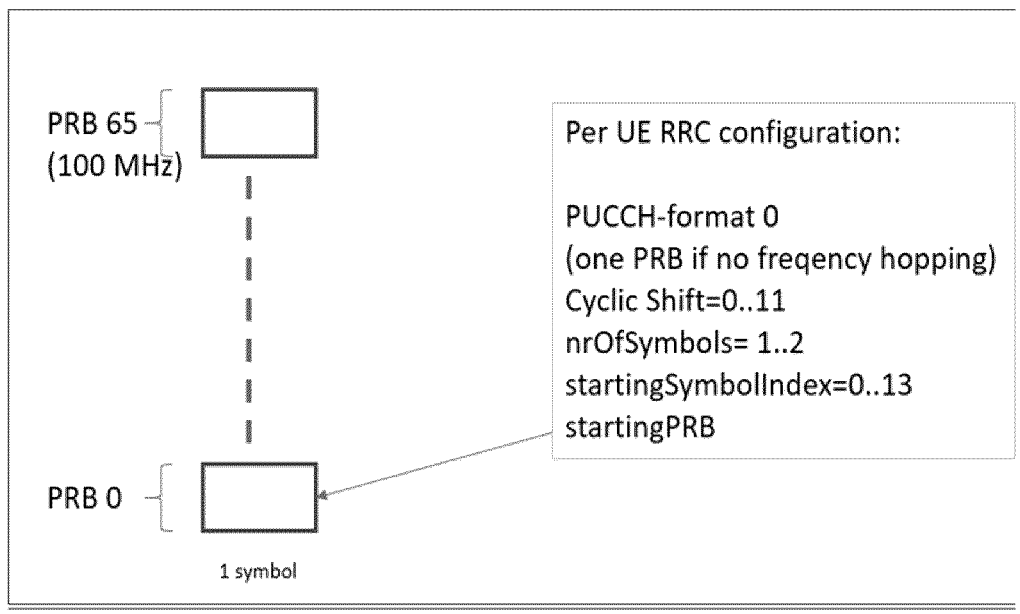
FIG. 5 shows Physical Resource Blocks, PRBs, according to an embodiment of the invention.

According to embodiments of the invention, multiple UE's can be configured within one and the same periodic SR symbol. The UE will be configured having an individual Physical Resource Block, PRB, and individual cyclic shift. Within a 100 MHz bandwidth this means 66*12 different UE's can be allocated, as further illustrated in FIG. 5

In an embodiment, a wide beam is used each time a periodic SR occurs. In the example embodiment, a maximum amount of SR opportunities is provided, i.e. 14. We also assume we use 7 wide beams in total in this example, denoted WB1, WB2 etc.

In another embodiment, an "adaptive wide beam switch scheme" is applied to use only those wide beams which serves UE's. E.g. if we assume exclusively WB1 WB2 and WB6 cover UEs—then the periodic SRs, 300, are only used for WB1, WB2 and WB6, I.e. the wide beam cycle is shortened, in order to shorten the delay when gNB decodes an SR from a UE.

It noted that the UE will not know whether gNB decodes the SR that the UE transmits. For instance, the UE in FIG. 4 may transmit periodic SRs 300 up to 7 times until gNB uses a correct wide beam and decodes the SR.

Figure 6:
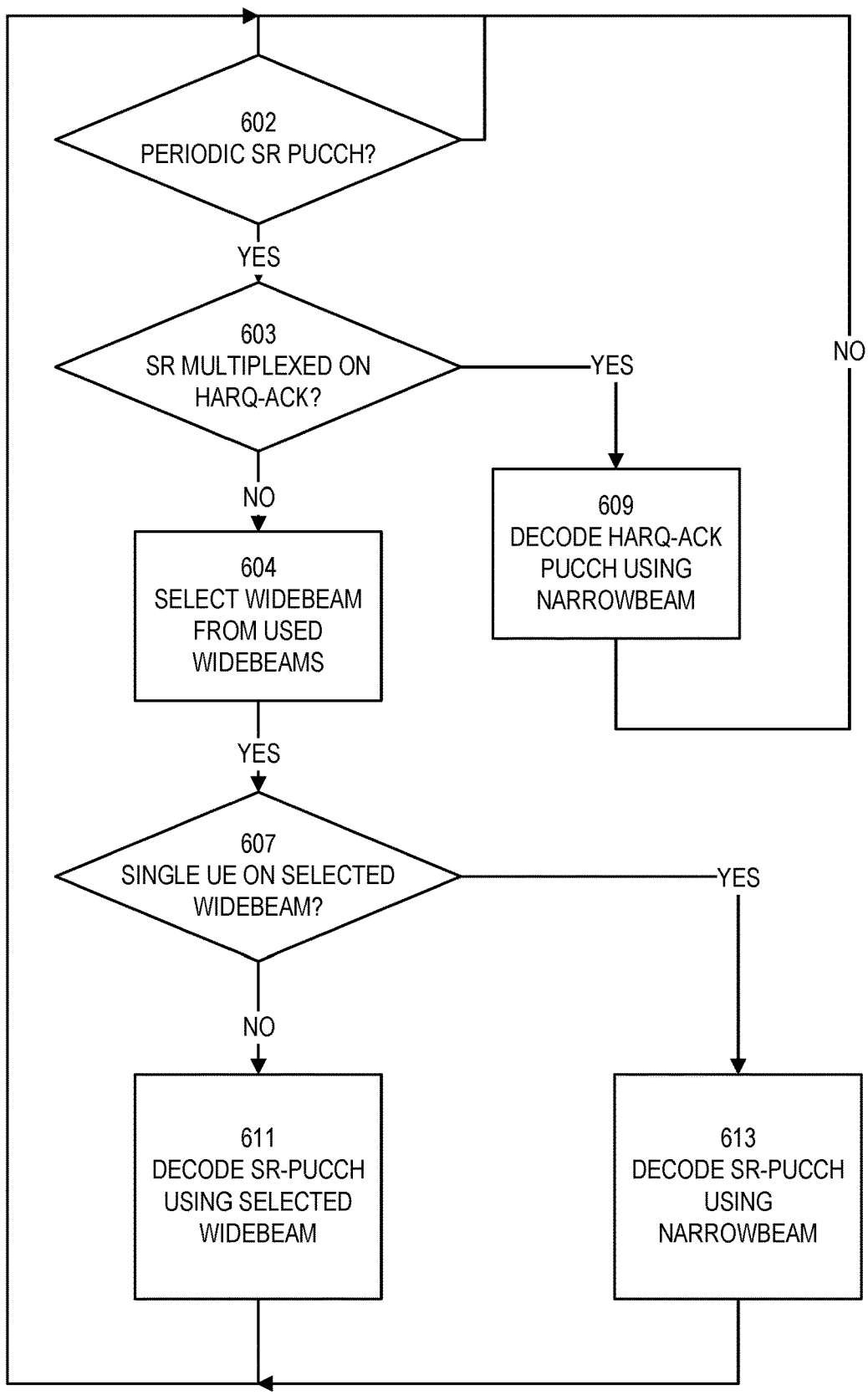
FIG. 6 shows a first aspect of a first embodiment of a method for the invention for selecting antenna beams for decoding a scheduling requests, SR, from a UE.

In FIG. 6, a first aspect of a first embodiment of a method for the invention for selecting antenna beams for decoding a scheduling requests, SR, from a UE, is illustrated.

In 602, it is established whether a periodic SR PUCCH occurs. If no, the method awaits such SR and if yes, the method further establishes, in 603, whether the SR is multiplexed on a HARQ-ACK message.

In 603, if yes, the method proceeds to 609 in which HARQ-ACK PUCCH is decoded using a narrow beam, and if no, to 0104 in which a wide beam is selected from used wide beams.

From 609, the method proceeds to 602. From 604, the method proceeds to 607, in which it is determined whether a single UE is falling within the coverage of the wide beam.

In 607, if yes—proceed to 611 in which the SR-PUCCH is decoded using the selected wide beam—and if no— proceed to 613 in the SR-PUCCH is decoded using a narrow beam.

In one embodiment all UE_ID's which exists from ACTIVE WIDEBEAM LIST for corresponding wide beam (step 303).

Figure 7:
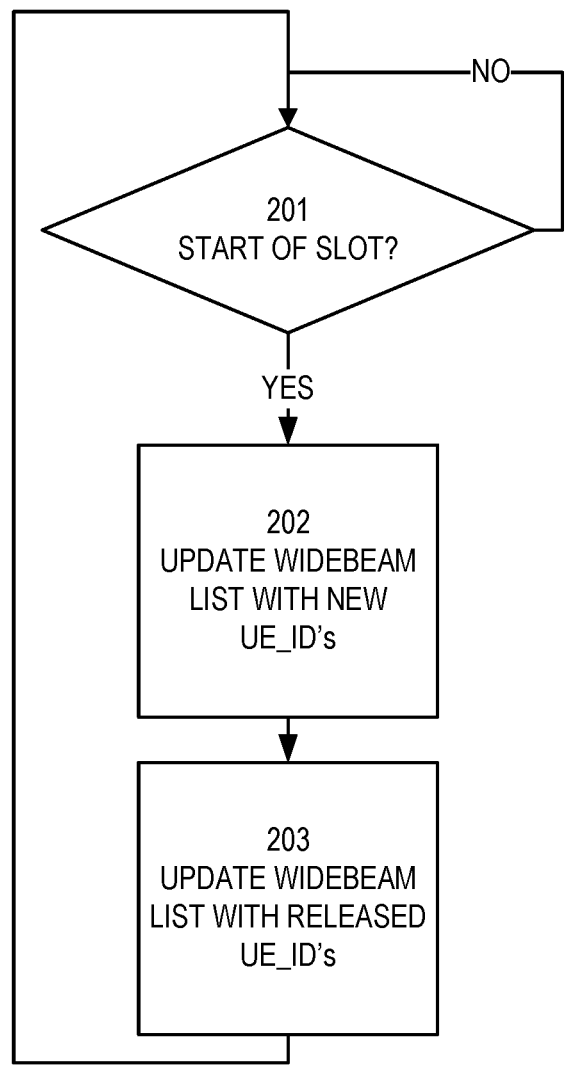
FIG. 7 shows a second aspect of the first embodiment of a method for the invention for updating a registration of UE's falling into the beam coverage of a wide beam.
Figure 8:
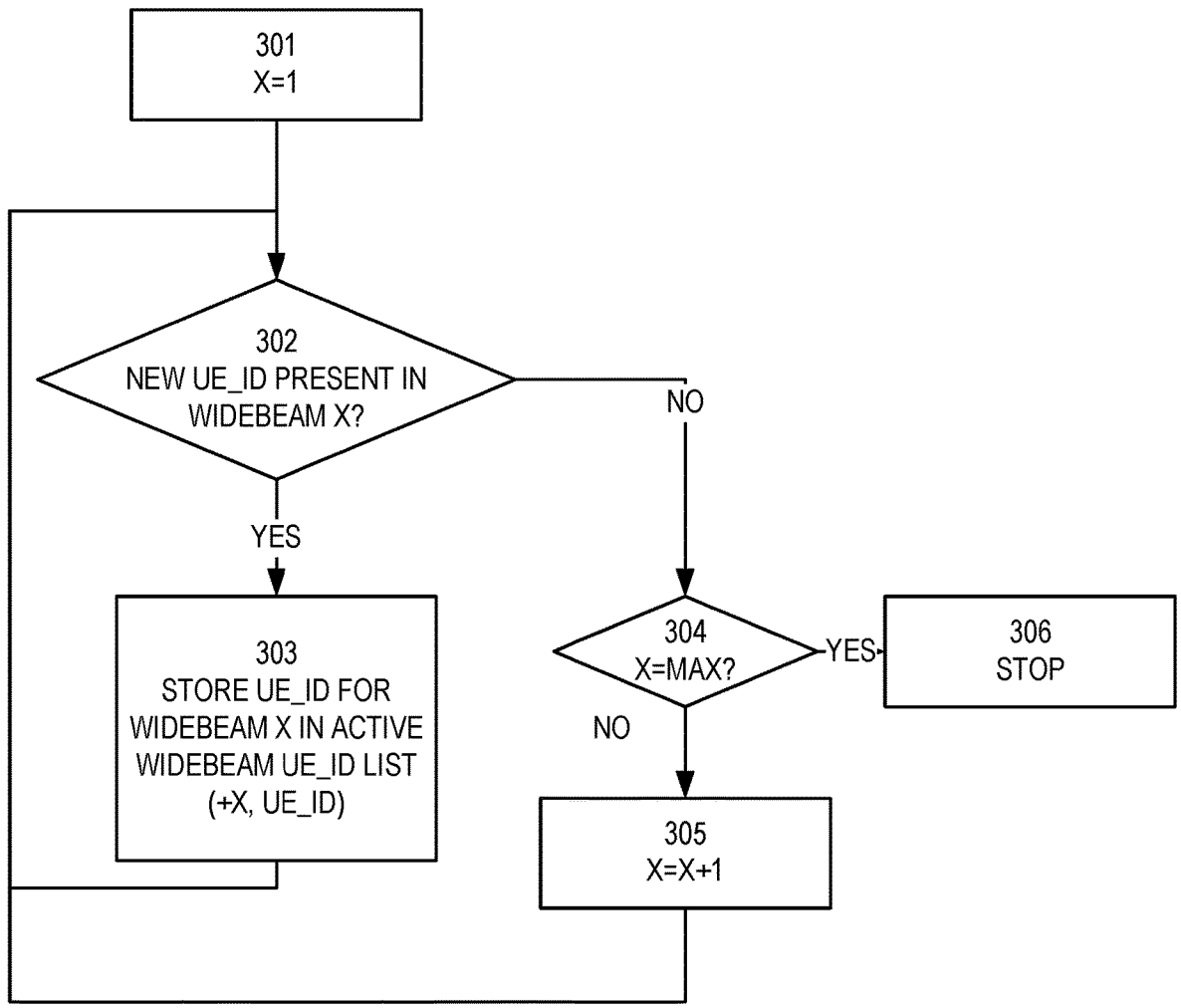
FIGS. 8 and 9 shows a third aspect of the first embodiment of a method for the invention for updating a registration of UE's falling into the beam coverage of a wide beam.
Figure 9:
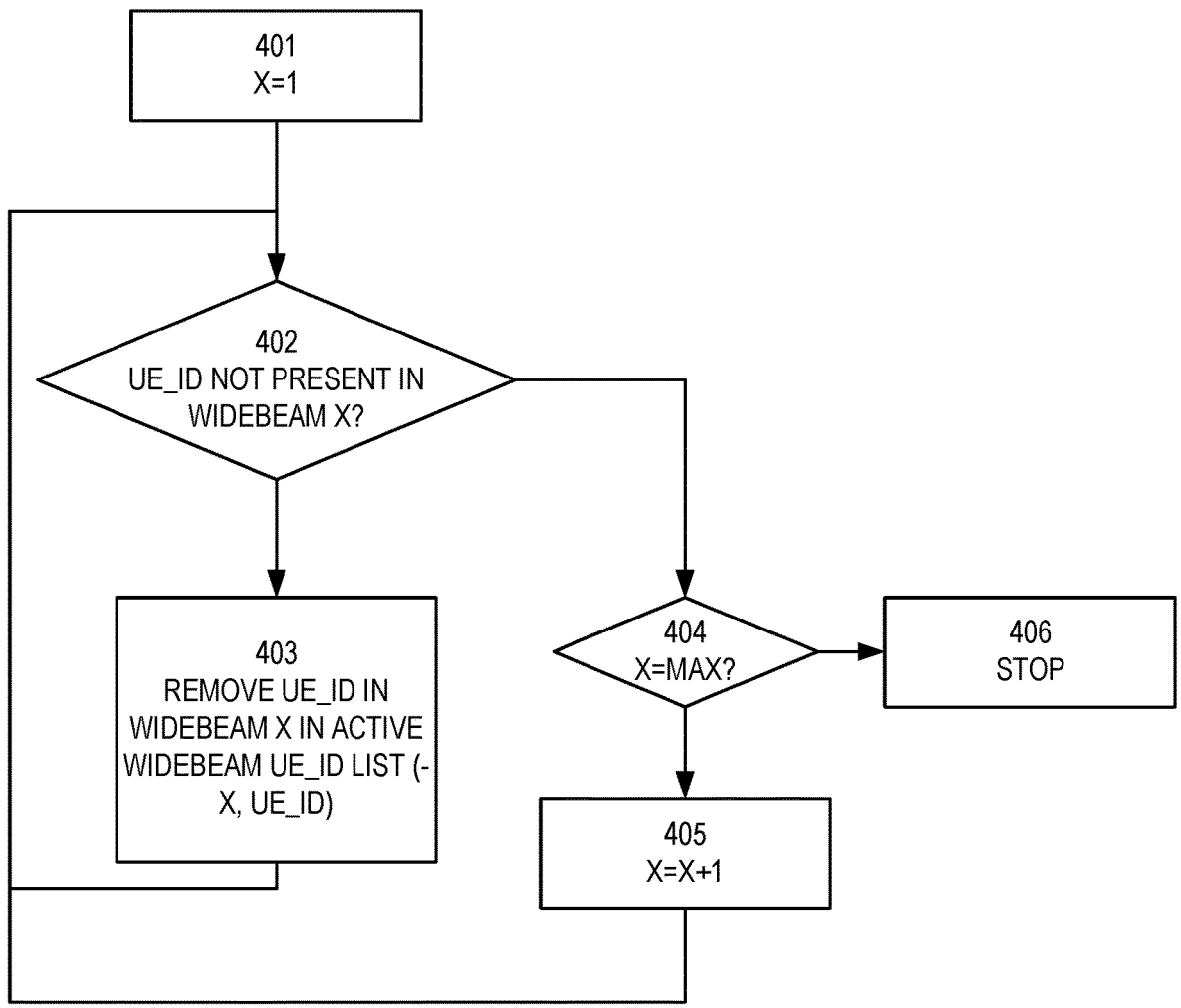

FIGS. 7, 8 and 9 show aspects of a method for updating given UEs that appear within the coverage of a wide beam over time.

In 201, in FIG. 7, it is determined whether a start of a slot has been reached 201; and if no, await the start. If yes, proceed to 202 in which a wide beam list is updated with new UE IDs. Moreover, the wide beam list id updated with respect to released UEs 203. The method returns to 201.

In FIG. 8, a counter X is initiated with value 1, in 301. The method proceeds to 302 in which it is determined whether a new UE_ID is present within the coverage for a wide beam index X. If so, the new UE_ID for wide beam X is stored in an active wide beam list associated with wide beam X listing UE_IDs, 303. If no new UE_ID is encountered in 302, index X is incremented 305, insofar a MAX value corresponding to the number of wide beams has not been reached, 306.

In FIG. 9, the process of removing (403) UEs not present (402) under a wide beam of index no X is shown. Steps 404 correspond to step 304, 405 to 305 and 406 to 306.

In this manner, respective updated lists of occurring UE's are tracked for each wide beam.

The lists will indicate whether a single UE is occurring within a respective wide beam, which is resolved in 607 in FIG. 6.

Figure 10:
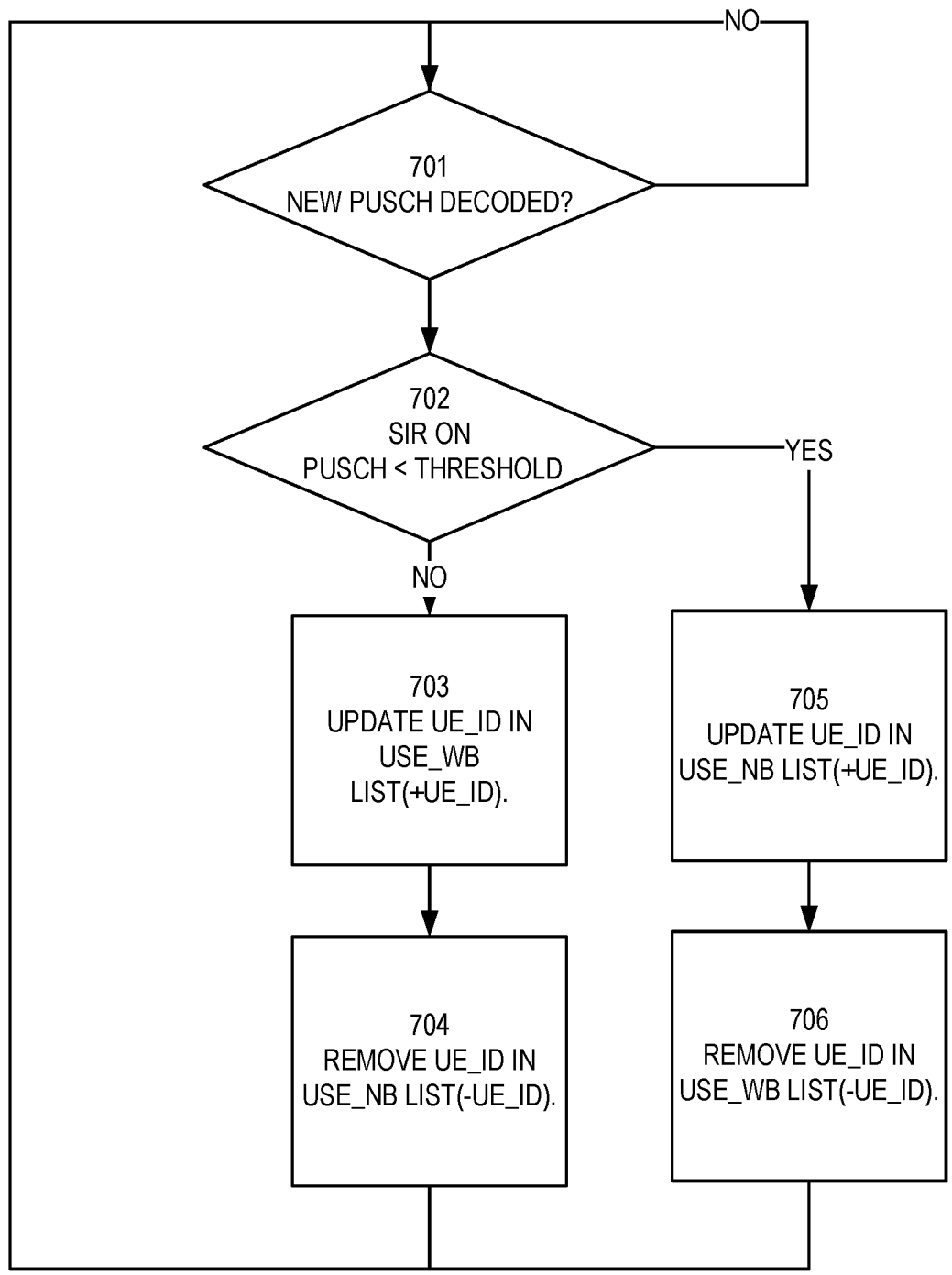
FIG. 10 shows a further embodiment of the invention.

In FIG. 10 a further aspect of the invention is shown. In step 701 it is determined whether a new PUSCH is decoded. In 702, if yes to 701, it is determined whether the Signal to interference Ratio, SIR, on the PUSCH is lower than a threshold.

If yes to 702, a UE—designated by its UE_ID—is included (703) in a list of UEs for which a wide beam is to be used (USE_WB_LIST) and the UE is removed (704) from a list of UEs for which a narrow beam is to be used (USE_NB_LIST), If no to 702, a UE—designated by its UE_ID—is included (705) in a list of UEs for which a narrow beam is to be used (USE_NB_LIST) and the UE is removed (706) from a list of UEs for which a wide beam is to be used (USE_WB_LIST).

The effect of the above aspects of embodiments of the invention is that UEs experiencing a below SIR threshold are reached by a narrow beam, whereas UEs having a SIR above the threshold are served by a wide beam having the effect that the wide beam is not overloaded. It is noted that a lower or equal to sign may be an option for the expression in 702.

It is noted that the features of the methods described above and in the following, may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. For example, the program code means may be loaded in a memory, such as a RAM (Random Access Memory), from a storage medium, such as a read-only memory (ROM) or other non-volatile memory, such as flash memory, or from another device via a suitable data interface, the described features may be implemented by hardwired circuitry instead of software or in combination with software.

A computer program or computer program product is provided carrying out the method steps defined above.

Figure 11:
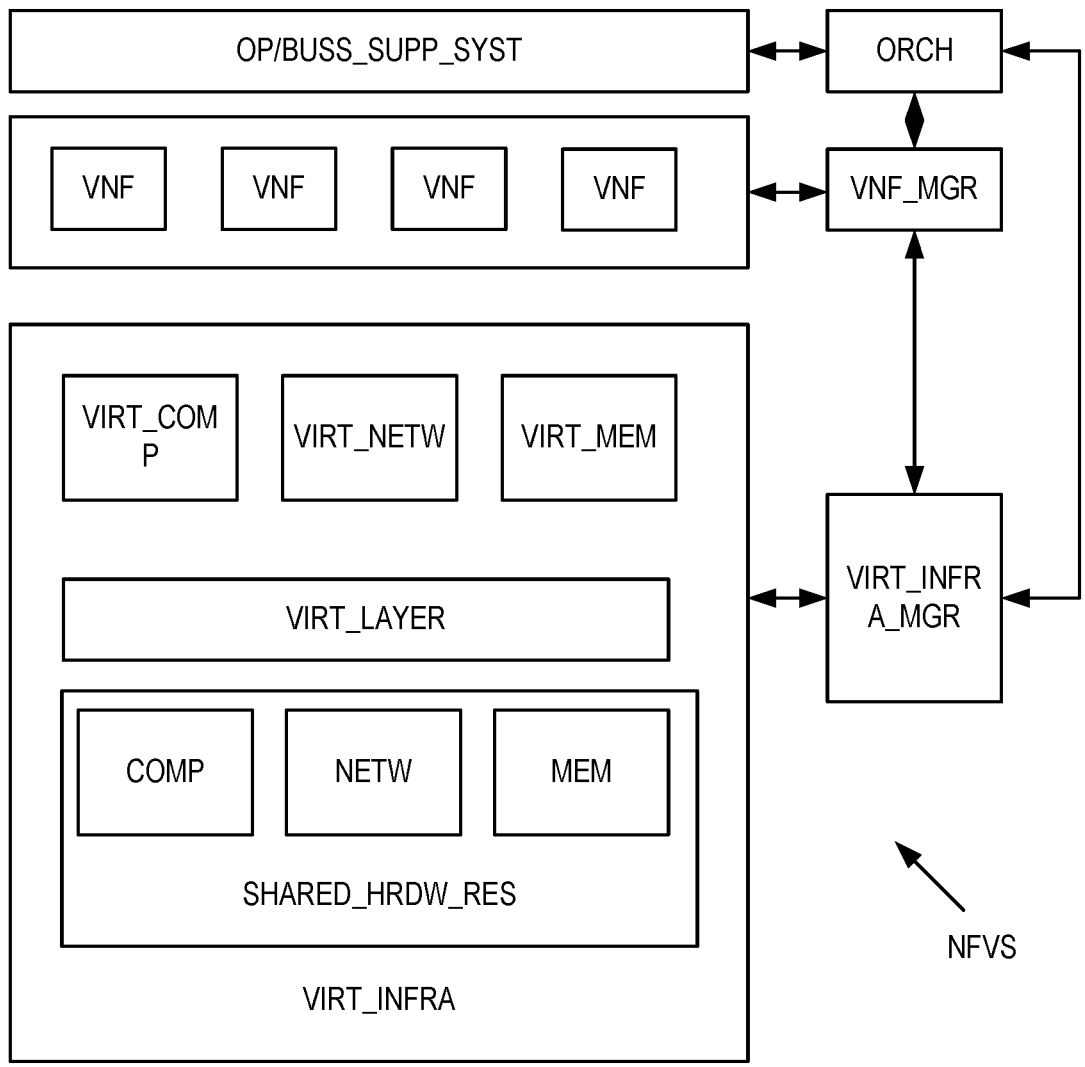
FIG. 11 shows aspects of the invention being implemented in a virtualized environment.

The methods discussed above may alternatively be implemented by means of a system based on network functions virtualization. In FIG. 11, further embodiments of the invention are implemented by means of such a network function virtualization system, NFVS, formed on e.g. general-purpose servers, standard storage and switches. The NFVS may be arranged along the lines described in FIG. 4, ETSI GS NFV 002 V. 1.1.1 (2013 October) and comprises the following elements: A NFV management and orchestration system comprising an Orchestrator, ORCH, a VNF manager, VNF_MGR, and a virtualised Infrastructure manager, VIRT_INFRA_MGR. The NFVS moreover comprises an operational/business support system, OP/BUSS_SUPP_SYST; a number of virtual network function instances, VNF, by which the method steps explained above are instantiated; and a virtualised infrastructure, VIRT_INFRA. The VIRT_INFRA comprises a virtual computing, VIRT_COMP, virtual network; VIRT_NETW, and virtual memory, VIRT_MEM, a virtualisation layer, VIRT_LAYER, (e.g. hypervisor) and shared hardware resources, SHARED_HARDW RES comprising computing devices, COMP, network devices, NETW, comprising e.g. standard switches and other network devices, and standard data storage devices, MEM.

To summarize, according to the invention there is provided:

A Method for a base station, gNB, communicating with a plurality of User Entities, UE1, UE2 according to a Time Division Duplex, TDD, access scheme via antennas, the base station moreover being adapted for receiving Scheduling Requests, SRs, from the UEs, a SR indicating a request for scheduling an uplink transmission from a UE. The base is station communicating over a plurality of antennas associated with respective wide beams, WB1-WBn, and narrow beams, NB, a plurality of wide beams, WB, WB1-WBn, covering respective areas, whereby for each wide beam, WB1-WBn, at least one narrow beam, NB, form a joint area with a wide beam, WB; WB1-WBn. The TDD scheme is involving at least a Physical Uplink Scheduling Control Channel, PUSCH, 102. The TDD scheme comprises periodically appearing SR occasions, 300, and the base station being adapted for receiving and decoding a transmission from a UE and establishing whether a SR from at least one UE is received in a periodic occasion.

The periodically appearing SR occasions may be distributed in such a manner that they reappear in at least a same slot number and/or symbol position of a frame in a repetitive sequence of frames, in other words such that the periodically appearing occasions are vertically aligned in the TDD scheme.

The base station may be a 5G base station, gNodeB, gNB, and each periodically occurring SR occasion, 300, being a periodic SR PUCCH, 602.

The base station may moreover be adapted for
using, 611, a wide beam, WB, for receiving and decoding at least one SR from a UE on the periodically occurring SR occasions, 300.
Moreover, the base station may be adapted for
determining, 607, whether at least one UE appears under a wide beam,
and
if a single UE appear under the wide beam,
using, 613, a narrow beam, NB, within the wide beam for receiving and decoding at least one periodic SR received from a UE under said wide beam.
Moreover, if a single UE does not appear under the wide beam, i.e. plural UEs under wide beam, the base station may be
using a wide beam to decode the SR-PUCCH.
Further, multiple UE's, UE, may be configured within one and the same periodic SR symbol, 300.

A method is also provided further comprising
determining, 603, whether the periodic SR-PUCCH is multiplexed on a Hybrid Automatic Repeat Request-Acknowledge, HARQ-ACK PUCCH, message, 602,
if yes to the determination whether the periodic SR-PUCCH is multiplexed on a HARQ-ACK PUCCH—
decoding, 609, the HARQ-ACK PUCCH,
if no to the determination whether the periodic SR-PUCCH is multiplexed on a HARQ-ACK PUCCH—
selecting, 604, a wide beam from used wide beams.

Further there is provided, A base station, gNB, comprising a processor, PCU_A, an interface, IF_A, and a memory, MEM_A, adapted for communicating with a plurality of User Entities, UE, UE1, UE2 according to a Time Division Duplex, TDD, access scheme via antennas, the base station moreover being adapted for receiving Scheduling Requests, SRs, from the UEs, a SR indicating a request for scheduling an uplink transmission from a UE.

The base station is communicating over a plurality of antennas associated with respective wide beams, WB1-WBn, and narrow beams, NB, a plurality of wide beams, WB, WB1-WBn, covering respective areas, whereby for each wide beam, WB1-WBn, at least one narrow beam, NB, form a joint area with a wide beam, WB; WB1-WBn. The TDD scheme involving at least a Physical Uplink Scheduling Control Channel, PUCCH, 102, wherein the TDD scheme comprises periodically appearing SR occasions, 300, the base station being adapted for receiving and decoding a transmission from a UE and establishing whether a SR from at least one UE is received in a periodic occasion.

The periodically appearing SR occasions may be distributed in such a manner that they reappear in at least a same slot number and/or symbol position of a frame in a repetitive sequence of frames, in other words, such that the periodically appearing occasions are vertically aligned in the TDD scheme.

The base station may be a 5G base station, gNodeB, gNB, and each periodically occurring SR occasion, 300, being a periodic SR PUCCH, 602.

The base station may be adapted for
using, 611, a wide beam, WB, for receiving and decoding at least one SR from a UE on the periodically occurring SR occasions, 300.
It may be moreover being adapted for
determining, 607, whether at least one UE appears under a wide beam,
and
if a single UE appear under the wide beam,
using, 613, a narrow beam, NB, within the wide beam for receiving and decoding at least one periodic SR received from a UE under said wide beam.
The base station may be adapted for, if a single UE does not appear under the wide beam, i.e. plural UEs under wide beam,
using a wide beam to decode the SR-PUCCH.
The base station may be further adapted for, to handle multiple UE's, UE, be configured within one and the same periodic SR symbol, 300.

The base station may further comprise
determining, 603, whether the periodic SR-PUCCH is multiplexed on a Hybrid Automatic Repeat Request-Acknowledge, HARQ-ACK PUCCH, message, 602,
if yes to the determination whether the periodic SR-PUCCH is multiplexed on a HARQ-ACK PUCCH—
decoding, 609, the HARQ-ACK PUCCH, if no to the determination whether the periodic SR-PUCCH is multiplexed on a HARQ-ACK PUCCH—selecting, 604, a wide beam from used wide beams.

The invention claimed is:

1. A method for a base station communicating with a plurality of User Entities, UEs, according to a Time Division Duplex, TDD, access scheme via antennas, the method comprising:
   receiving a plurality of Scheduling Requests, SRs, from the UEs, each SR indicating a request for scheduling an uplink transmission from a respective UE of the plurality of UEs, the base station communicating over a plurality of antennas associated with a plurality of wide beams and a plurality of narrow beams, each of the plurality of wide beams covering a respective area, whereby for each respective wide beam of the plurality of wide beams, at least one narrow beam of the plurality of narrow beams forms a joint area with the respective wide beam, the TDD scheme involving at least a Physical Uplink Scheduling Control Channel, PUSCH, the TDD scheme including periodically appearing SR occasions;
   receiving and decoding a transmission from a first UE of the plurality of UEs;
   establishing whether a SR, of the plurality of SRs, from the first UE is received in a periodic occasion;
   determining whether any of the plurality of UEs appears under a first wide beam of the plurality of wide beams; and
   determining that a single UE appears under the first wide beam, and based on the determining that the single UE appears under the first wide beam:
      using a first narrow beam, of the plurality of narrow beams, within the first wide beam for receiving and decoding at least a first periodic SR received from the single UE that appears under the wide beam.

2. The method according to claim 1, wherein the periodically appearing SR occasions are distributed in such a manner that they reappear in one or more of:
   at least a same slot number, and
   at least a same symbol position,
   of a frame in a repetitive sequence of frames.

3. The method according to claim 2, wherein the base station is a 5G base station, gNodeB, and each periodically occurring SR occasion is a periodic Scheduling Request Physical Uplink Control Channel, SR-PUCCH.

4. The method according to claim 2, further comprising:
   using at least one of the plurality of wide beams for receiving and decoding at least one SR of the SRs from the first UE on the periodically occurring SR occasions.

5. The method according to claim 2, wherein multiple UEs are configured within one and the same periodic SR symbol.

6. The method according to claim 1, wherein the base station is a 5G base station, gNodeB, and each periodically occurring SR occasion is a periodic Scheduling Request Physical Uplink Control Channel, SR-PUCCH.

7. The method according to claim 6, the method further comprising:
   determining whether the periodic SR-PUCCH is multiplexed on a Hybrid Automatic Repeat Request-Acknowledge, HARQ-ACK PUCCH, message;
   if yes to the determination whether the periodic SR-PUCCH is multiplexed on a HARQ-ACK PUCCH—decoding the HARQ-ACK PUCCH; and if no to the determination whether the periodic SR-PUCCH is multiplexed on a HARQ-ACK PUCCH—selecting a second wide beam from the plurality of wide beams.

8. The method according to claim 1, further comprising:
   using at least one of the plurality of wide beams for receiving and decoding at least one SR of the SRs from the first UE on the periodically occurring SR occasions.

9. The method according to claim 1 wherein, if multiple UEs appear under the first wide beam:
   using the first wide beam to decode a Scheduling Request Physical Uplink Control Channel, SR-PUCCH.

10. The method according to claim 1, wherein multiple UEs are configured within one and the same periodic SR symbol.

11. A base station comprising a processor, an interface and a memory, configured to communicate with a plurality of User Entities, UEs, according to a Time Division Duplex, TDD, access scheme via antennas, the base station being configured to:
   receive a plurality of Scheduling Requests, SRs, from the UEs, each SR indicating a request for scheduling an uplink transmission from a respective UE of the plurality of UEs, the base station communicating over a plurality of antennas associated with a plurality of wide beams and a plurality of narrow beams, each of the plurality of wide beams covering a respective area, whereby for each respective wide beam of the plurality of wide beams, at least one narrow beam of the plurality of narrow beams form a joint area with the respective wide beam, the TDD scheme involving at least a Physical Uplink Scheduling Control Channel, PUSCH, the TDD scheme including periodically appearing SR occasions;
   receive and decode a transmission from a first UE of the plurality of UEs;
   establish whether a SR, of the plurality of SRs, from the first UE is received in a periodic occasion;
   determine whether any of the plurality of UEs appears under a first wide beam of the plurality of wide beams; and
   determining that a single UE appears under the first wide beam, and based on the determining that the single UE appears under the first wide beam:
      use a first narrow beam, of the plurality of narrow beams, within the first wide beam for receiving and decoding at least a first periodic SR received from the single UE that appears under the wide beam.

12. The base station according to claim 11, wherein the periodically appearing SR occasions are distributed in such a manner that they reappear in one or more of:
   at least a same slot number, and
   at least a same symbol position,
   of a frame in a repetitive sequence of frames.

13. The base station according to claim 11, wherein the base station is a 5G base station, gNodeB, and each periodically occurring SR occasion is a periodic Scheduling Request Physical Uplink Control Channel, SR-PUCCH.

14. The base station according to claim 13, wherein the base station is further configured to:
   determine whether the periodic SR-PUCCH is multiplexed on a Hybrid Automatic Repeat Request-Acknowledge, HARQ-ACK PUCCH, message;
   if yes to determining that the periodic SR-PUCCH is multiplexed on a HARQ-ACK PUCCH—decode the HARQ-ACK PUCCH; and if no to determining that the periodic SR-PUCCH is multiplexed on a HARQ-ACK PUCCH—select a second wide beam from the plurality of wide beams.

15. The base station according to claim 11, wherein the base station is further configured to:
use at least one of the plurality of wide beams for receiving and decoding at least one SR of the SRs from the first UE on the periodically occurring SR occasions.

16. The base station according to claim 11 wherein the base station is further configured to, if multiple UEs appear under the first wide beam:
use the first wide beam to decode a Scheduling Request Physical Uplink Control Channel, SR-PUCCH.

17. The base station according to claim 11, wherein multiple UEs are configured within one and the same periodic SR symbol.

* * * * *